Aug. 5, 1924.  
B. NILSSON  
SAFETY AUTOMOBILE CRANK  
Filed Oct. 23, 1922   3 Sheets-Sheet 1
1,503,963
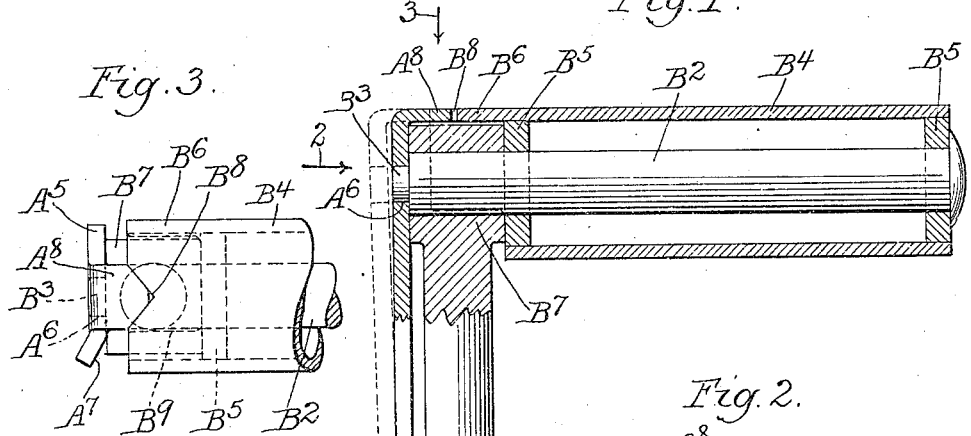
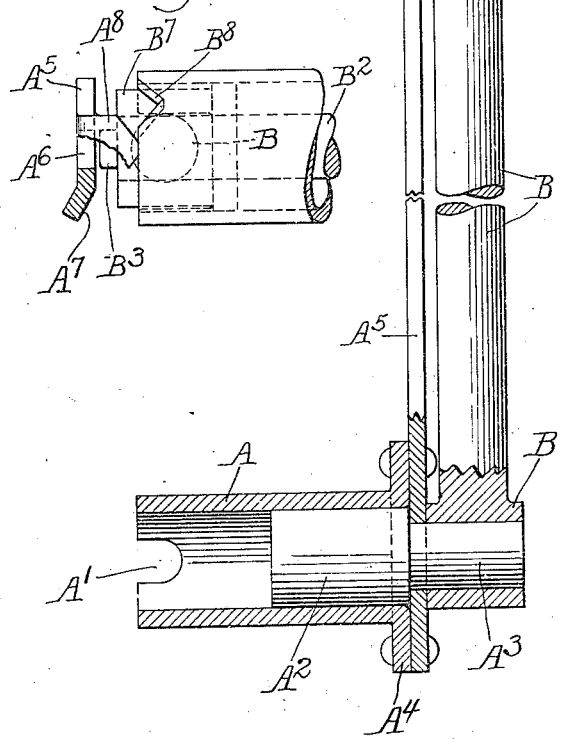
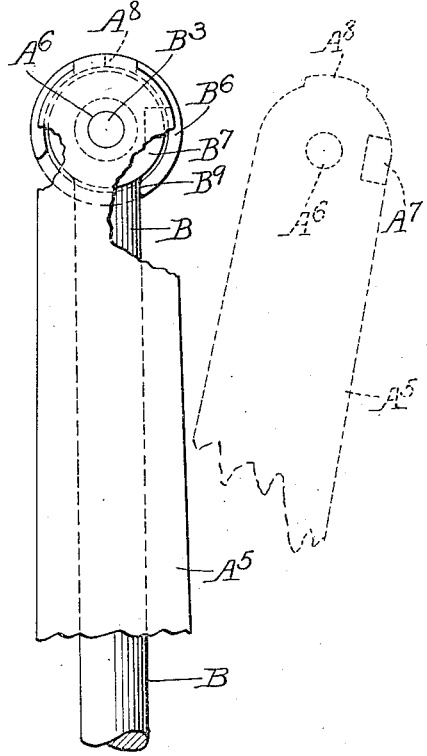
Witness  
Edward F. Wray
Inventor.  
Bernhard Nilsson  
by Parker & Carter  
Attorneys.

Aug. 5, 1924.                                           1,503,963
                        B. NILSSON
                 SAFETY AUTOMOBILE CRANK
                Filed Oct. 23, 1922         3 Sheets-Sheet 2
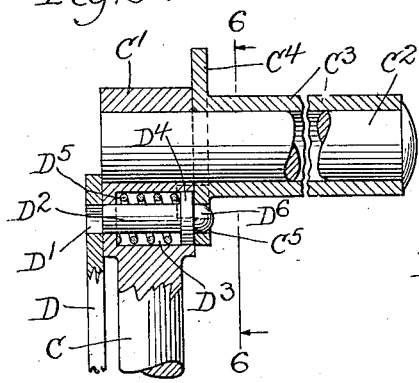
Fig. 5.
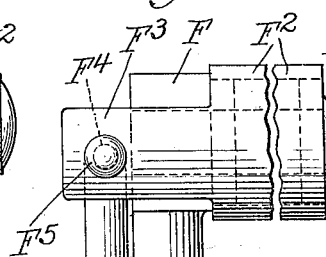
Fig. 8.
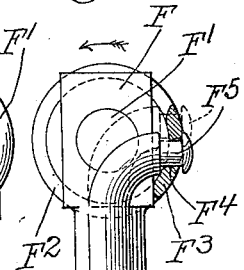
Fig. 9.
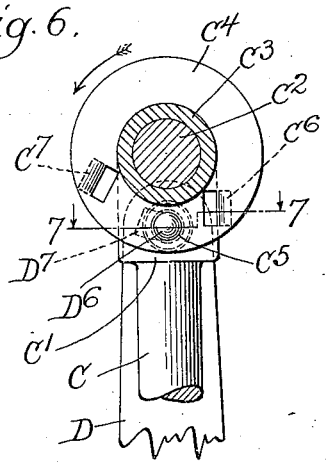
Fig. 6.
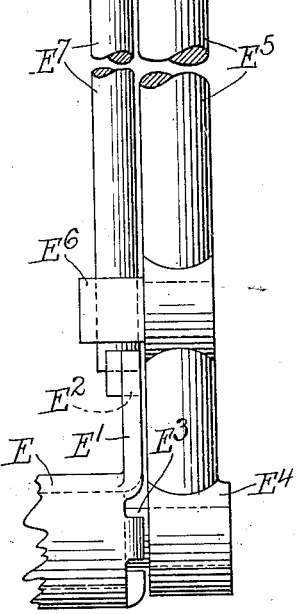
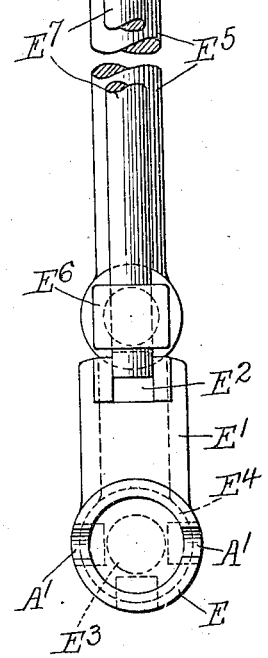
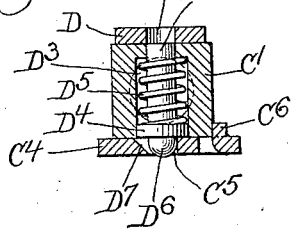
Fig. 7.
Witness.
Edward T. Wray.
Inventor.
Bernhard Nilsson.
by Parker & Carter
Attorneys

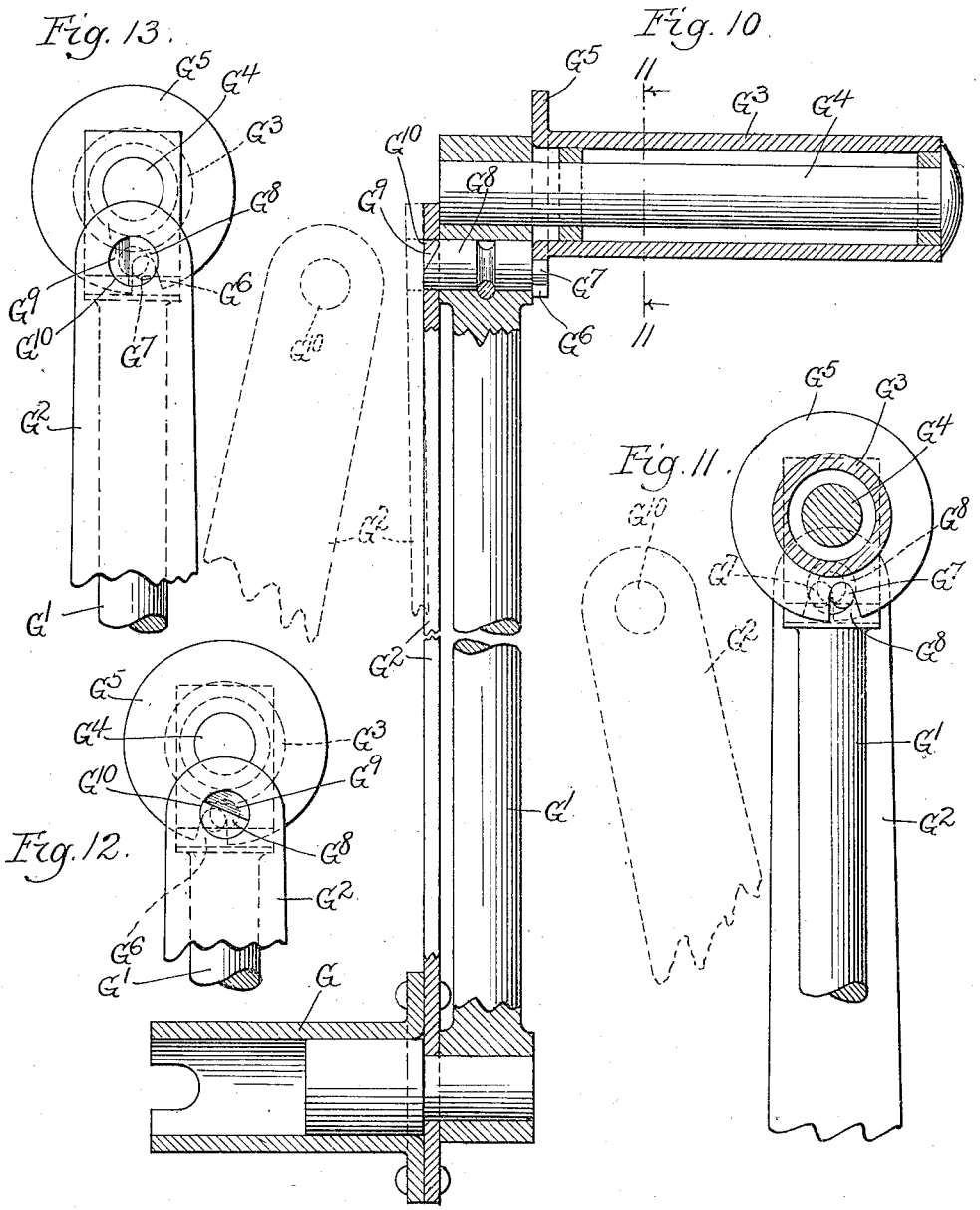

Patented Aug. 5, 1924.

1,503,963

UNITED STATES PATENT OFFICE.

BERNHARD NILSSON, OF CHICAGO, ILLINOIS.

SAFETY AUTOMOBILE CRANK.

Application filed October 23, 1922. Serial No. 596,212.

*To all whom it may concern:*

Be it known that I, BERNHARD NILSSON, a subject of the King of Sweden, residing at Chicago, in the county of Cook and State of Illinois, have invented a certain new and useful Improvement in Safety Automobile Cranks, of which the following is a specification.

My invention relates to improvements in automobile starting crank and has for one object to provide a new and improved form of crank wherein an automatic safety device is provided by the use of which the operator is protected in the event of backfire or reverse rotation of the crank shaft.

I have shown a number of modified forms of my invention and all of them have this in common, there is provided a relatively large cylindrical handle so arranged that when the operator turns the crank in the normal direction for starting, this handle piece rotated in his hand as the crank rotates but if the crank is driven by a backfire in the opposite direction, the hand piece will be free to rotate through a limited excursion with respect to the crank member and this rotation will operate the latch which disengages the driving connection between the handle and engine shaft so that the engine will be free to rotate without harm to the operator. This is accomplished by having two separate crank members, one of them rotatably mounted on the engine crank and carrying a hand piece, and another held against rotation with respect to the engine crank parallel with the first and latched to it at its outer end by a latch adapted to be released by the rotary movement of the hand piece with respect to the crank.

My invention, therefore comprises a safety crank and has for further objects to provide such a crank as may be used detachably in connection with automobile engines, having an electric starting mechanism which make it unnecessary to keep the hand starting crank constantly in position.

My invention is illustrated more or less diagrammatically in the accompanying drawings, wherein—

Figure 1 is a side elevation in part section of a preferred form of my invention;

Figure 2 is a detail view of Figure 1 with parts broken away looking in direction of the arrow 2 in Figure 1;

Figure 3 is a detail plan view of a part of the crank looking in direction of the arrow 3 in Figure 1;

Figure 4 is a detailed view similar to Figure 3 with parts broken away and in section showing arrangement of parts after the release member has operated;

Figure 5 is a detail section showing a modified form;

Figure 6 is a section along the line 6—6 of Figure 5;

Figure 7 is a section along the line 7—7 of Figure 6;

Figure 8 is a side elevation of a further modified form;

Figure 9 is an end view in part section of the device shown in Figure 8;

Figure 10 is a side elevation in part section with a further modified form;

Figure 11 is a section along the line 11—11 of Figure 10;

Figure 12 is a view showing the parts in locked position;

Figure 13 is a view showing the parts in the released position.

Like parts are indicated by like figure and drawings.

A is a sleeve adapted to fit over the end of an automobile or engine crank shaft. It is notched at $A'$ to engage the pin on the crank shaft to hold the sleeve against rotation with respect to the shaft. $A^2$ is a block closing this sleeve and having at its outer end projecting beyond the sleeve an operating pin $A^3$. The sleeve A is flanged at $A^4$ and has riveted or otherwise rigidly attached to the flange in the preferred form the spring crank arm $A^5$. This crank arm $A^5$ is perforated at $A^6$, is cut away or inclined at $A^7$ and terminates in a pointed engaging cam member or tooth $A^8$ extending in a direction at right angles to the balance of the crank member $A^5$.

B is a crank member having a hub $B'$ rotatably mounted on the pin $A^3$. At its end it carries the handle pin $B^2$ terminating in a cylindrical lug $B^3$ engaging the perforation $A^6$ in the member $A^5$. $B^4$ is a cylindrical hand piece mounted for rotation on the pin $B^2$ by means of annular washers $B^5$ $B^5$. This hand member has an extension $B^6$, extending over the enlarged part $B^7$ on the end of the crank B. This extension member or apron $B^6$ is notched at $B^8$ to be engaged by the member $A^8$ so that when the hand member $B^4$ is in the normal working position shown in Figures 1, 2 and 3, the spring member $A^5$ is free to press in to be engaged by the lug or pin $B^3$ so as to lock all parts together in operative relation with the edge $B^5$ of the apron $B^6$ engaging the shank of the shaft member B to prevent rotation of the handle $B^4$ in a counter clockwise direction as shown in Figure 2. If the operator rotates the crank in a clock-wise direction, he will tend to hold the parts in position shown in Figure 2 and both of the crank elements will rotate in unison. If, however, as the operator holds the crank in his hand, there is a back-fire tending to rotate the crank in a counter clock-wise direction, this will tend to rotate the handle in a clock-wise direction about its pin and will throw the parts into the position shown in Figure 4, such that the cam surface will thrust the member $A^8$ out of the notch $B^8$ and disengage the pin from the spring crank member and leave the spring crank member free to rotate in counter clock-wise direction while the part of the crank held by the operators hand remains at rest. When the force of the explosion is spent, the operator can then bring the two parts together, this being facilitated by the inclined cut away portion of the spring arm as shown in Figure 4.

In the modified form shown in Figures 5, 6 and 7 the only difference is in the form of lock or latch. In this case, the rigid handle carrying the crank member C terminates in a hub $C'$ from which laterally projects a crank handle pin $C^2$. $C^3$ is a handle sleeve rotatably mounted thereon, provided with a flange $C^4$. This flange has a circular perforation $C^5$ and on either side of this perforation are inwardly extending ears $C^6$ $C^7$, one or the other adapted to engage the large hub $C'$ and limit the rotation of the handle sleeve to its pin.

D is a crank member rigidly attached to the sleeve $A^4$ as in Figure 1. It terminates in a plane end, however, perforated at $D'$ which perforation is adapted to be engaged by the locking pin $D^2$. This locking pin slides in a pocket $D^3$, and is provided with a flange $D^4$ and is yieldingly held in the retracted position by a spring $D^5$. When the rounded end $D^6$ is in line, it penetrates through the aperture $C^5$ in the flange $C^4$. The aperture $C^5$ being provided with an inclined side $D^7$ as indicated in Figure 7.

As shown the operation of this device is exactly the same as the preferred form. The lugs $C^6$ $C^7$ limit the rotary excursion of the sleeve with respect to the pin $C^2$. When the parts are in position shown in Figures 5, 6 and 7, the latch pin is out and the flat crank is free to rotate independent of the rigid crank and independent of the handle. If the sleeve $C^3$ is rotated in the direction of the arrow in Figure 6, the wedge or cam surface $D^7$ would engage the ball $D^6$, compress the spring $D^5$ and thrust the pin $D^2$ into locking engagement with the crank member D and the operator can then start the engine. If he gets a kick back, however, it will cause the sleeve $C^3$ to rotate in opposite direction, back to the position shown in Figures 5, 6 and 7, leaving the spring crank member free to rotate without interference.

In the further modified form shown in Figures 8 and 9, E is a sleeve adapted to engage the engine crank shaft. $E'$ is a driving arm extending upwardly thereon and forked at $E^2$. $E^3$ is a bearing pin extending outwardly from the interior of the sleeve E and it is rotatably mounted upon it. The hub $E^4$ carries the crank arm $E^5$. This crank arm $E^5$ is provided with a guide block $E^6$ for the latch rod $E^7$ which is adapted to penetrate the forked end of the lever $E'$ to hold it against rotation with respect to the crank $E^5$.

F is a square block on the upper end of the crank $E^5$ carrying the pin $F'$ upon which is rotatably mounted a hollow cylindrical handle $F^2$. This handle has a segmental extension $F^3$ extending inwardly beyond the block F. This extension is perforated as at $F^4$ to engage the bent end $F^5$ of the latch rod $E^7$, which rod is necked down as indicated and riveted to hold the parts in position.

When the parts are in the position shown in Figures 8 and 9, the operator in starting the engine will rotate the crank in a counter-clockwise direction on the engine shaft. Since he holds the sleeve $F^2$ firmly in his hand as he rotates the crank, it tends to rotate that sleeve in a clockwise direction about its axis on the end of the shaft and this tends to push down on the member $F^5$ keeping the lock latch in place so that the rotation of the crank drives the engine crank shaft. If the engine kicks back, it will tend to rotate the starting crank in a clockwise direction and since the operator would still hold the sleeve $F^2$ and it would not rotate in his hand very freely, the sleeve will be rotated in a counter-clockwise direction about its axis and this will tend to lift on the part $F^4$ bringing it into the position shown in dotted lines in Figure 9, disengaging the latch and permitting the engine crank shaft to rotate freely without causing further rotation of the starting crank.

In the modified form shown in Figures 10 and 13 inclusive, G is an engine crank engaging member having pivoted thereon for rotation the hand crank $G'$. $G^2$ is a spring crank element rigidly mounted on the member G. $G^3$ is a hand piece rotatably mounted on the pin $G^4$. Projecting from the member G and the hand piece $G^3$ is a flange $G^5$. This flange is notched at $G^6$ to engage the eccentric pin G⁷ on the rotary latch G⁸ which latch is held in position in the hand member G′ and has an inclined latching element G⁹ adapted to engage the perforation or aperture G¹⁰ in the end of the member G². When the operator is holding the crank for starting the rotary latch is rotated in the position shown in Figure 12 and the members G′ G² are locked together and rotated in unison. If there is a back-fire and rotation in reverse direction takes place, the friction of the operators hand will move the parts into position shown in Figure 13 and the spring member G² will slide over the inclined latch and disengage.

It will be evident that while I have shown in my drawings an operative device, still many changes might be made in the size, shape and arrangement of parts and I wish that my invention be regarded as in a sense diagrammatical.

I claim:

1. A starting crank for engines and the like comprising a sleeve adapted to be held against rotation with respect to an engine crank shaft, a crank rotatably mounted upon said sleeve, a handle mounted upon said crank and rotatable about an axis parallel to the axis of the crank shaft, a latch element rigidly secured to the sleeve element at one end, and normally in engagement with the outer end of the crank at its other end, and means responsive to rotation of the handle for axially moving said latch to disengage it from said crank.

2. A starting crank for engines and the like comprising a sleeve adapted to be held against rotation with respect to an engine crank shaft, a crank rotatably mounted upon said sleeve, a handle mounted upon said crank and rotatable about an axis parallel to the axis of the crank shaft, a second crank rigidly mounted upon said sleeve, a normally operative connection between the outer extremities of said fixed and rotatable cranks, and means responsive to the rotation of said handle for disengaging said rotating from said fixed crank.

3. A starting crank for engines and the like comprising a sleeve adapted to be held against rotation with respect to an engine crank shaft, a crank rotatably mounted upon said sleeve, a handle mounted upon said crank and rotatable about an axis parallel to the axis of the crank shaft, a flexible crank rigidly mounted upon said sleeve, a normally operative connection between the outer extremities of said fixed and rotatable cranks, and means responsive to the rotation of said handle for flexing said flexible crank to disengage it from said rotating crank.

4. A starting crank for engines and the like comprising a sleeve adapted to be held against rotation with respect to an engine crank shaft, two cranks one loosely mounted upon said sleeve and one rigidly mounted in relation to said sleeve, means for locking them together, a handle on the loose crank, means responsive to a rotation of the handle for releasing the locking means, and means for preventing movement of the handle with respect to the crank when the operator is rotating the crank in the normal direction, the handle being free to rotate when the crank is rotated in a reverse direction.

5. A starting crank for engines and the like comprising a sleeve adapted to be held against rotation with respect to an engine crank shaft, two cranks one loosely mounted upon said sleeve and one rigidly mounted in relation to said sleeve, means for locking them together, a handle on the loose crank and means responsive to a rotation of the handle for releasing the locking means, the locking means comprising a pin on the loose crank adapted to engage a perforation in the tight crank, the pin and tight crank being movable with respect to one another to engage and disengage the lock.

6. A starting crank for engines and the like comprising a sleeve adapted to be held against rotation with respect to an engine crank shaft, two cranks one loose and one tight on the sleeve, means for locking them together, a handle on the loose crank and means responsive to a rotation of the handle for releasing the locking means, the locking means comprising a pin on the loose crank adapted to engage a perforation in the tight crank, the pin and tight crank being movable with respect to one another to engage and disengage the lock, and yielding means controlling the operation of the locking members.

7. A starting crank for engines and the like comprising two crank members one rigid one flexible, a pin on one adapted to engage a perforation in the other, a handle on the rigid member and means operative when the handle rotates with respect to it for deflecting the flexible member to throw the pin out of engagement with the perforation and permit rotation of the two members with respect to one another.

8. A starting crank for engines and the like comprising two crank members one rigid one flexible, a pin on one adapted to engage a perforation in the other, a handle on the rigid member and means operative when the handle rotates with respect to it for deflecting the flexible member to throw the pin out of engagement with the perforation and permit rotation of the two members with respect to one another, said means comprising an inclined cam surface on the handle and a movable member in opposition to it.

9. A starting crank for engines and the like comprising two crank members one rigid one flexible, a pin on one adapted to engage a perforation in the other, a handle on the rigid member and means operative when the handle rotates with respect to it for deflecting the flexible member to throw the pin out of engagement with the perforation and permit rotation of the two members with respect to one another, said means comprising an inclined cam surface on the handle and a movable member in opposition to it, and means for limiting the rotary excursion of the handle with respect to the crank upon which it is mounted.

10. A starting crank for engines and the like comprising two crank members, a pin on one adapted to enagage a perforation in the other, a handle rotatably mounted on one and means responsive to rotation thereof for moving the pin and perforation out of engagement with one another to permit rotation of the crank members with respect to one another.

11. A starting crank for engines and the like comprising two crank members, a pin on one adapted to engage a perforation in the other, a handle rotatably mounted on one and means responsive to rotation thereof for moving the pin and perforation out of engagement with one another to permit rotation of the crank members with respect to one another, said means comprising a cam surface on the handle and a cam engaging element in opposition thereto.

12. A starting crank for engines and the like comprising two crank members one rigid, one flexible, a pin on one adapted to engage a porforation in the other, a handle on the rigid member and means operative when the handle rotates with respect to it for deflecting the flexible members to throw the pin out of engagement with the perforation and permit rotation of the two members with respect to one another, the handle having an extension overlying the crank adapted to engage the crank and to limit its rotary excursion, a notch in such extension and a lug on the flexible crank adapted to engage such notch.

13. A starting crank for engines and the like comprising two crank members one rigid one flexible, a pin on one adapted to engage a perforation in the other, a handle on the rigid member and means operative when the handle rotates with respect to it for deflecting the flexible member to throw the pin out of engagement with the perforation and permit rotation of the two members with respect to one another, the handle having an extension overlying the crank adapted to engage the crank and to limit its rotary excursion, a notch in such extension and a lug on the flexible crank adapted to engage such notch, and an inclined surface on the flexible crank adapted to ride over the locking pin and to permit reengagement of the parts after the lock has once been broken.

Signed at Chicago, county of Cook, and State of Illinois, this 20th day of October, 1922.

BERNHARD NILSSON.